United States Patent

Campbell et al.

[11] B 3,997,017
[45] Dec. 14, 1976

[54] AUXILIARY HYDROSTATIC FRONT WHEEL DRIVE SYSTEM

[75] Inventors: John A. Campbell, Decatur; Joseph E. Dezelan, Joliet, both of Ill.; Cullen P. Hart, Chofu, Japan

[73] Assignee: Caterpillar Tractor Co., Peoria, Ill.

[22] Filed: Jan. 14, 1974

[21] Appl. No.: 432,969

[44] Published under the second Trial Voluntary Protest Program on March 2, 1976 as document No. B 432,969.

[52] U.S. Cl. ............................. 180/44 F; 180/66 R
[51] Int. Cl.² ............................. B60K 25/00
[58] Field of Search ............ 180/44 R, 44 F, 66 R, 180/44 M; 192/85 R; 60/435, 402; 91/412

[56] References Cited
UNITED STATES PATENTS

| 2,397,299 | 3/1946 | Strid | 60/402 |
|---|---|---|---|
| 3,481,419 | 12/1969 | Kress et al. | 180/53 R |
| 3,579,988 | 5/1971 | Firth et al. | 180/44 F |
| 3,833,100 | 9/1974 | Aschauer | 192/85 |
| 3,851,741 | 12/1974 | Sugahara et al. | 192/85 R |

*Primary Examiner*—M. H. Wood, Jr.
*Assistant Examiner*—Jack D. Rubenstein
*Attorney, Agent, or Firm*—Phillips, Moore, Weissenberger, Lempio & Strabala

[57] ABSTRACT

A vehicle such as a motor grader includes a hydrostatic auxiliary front wheel drive system which utilizes implement system pressurized fluid flow to drive a pair of fixed displacement hydraulic motors, such motors being drivingly connected to cause rotation of the front wheels. A pilot operated series-parallel valve in combination with a flow divider allows the motors to be driven in series or in parallel. A directional control valve is selectively responsive to operator control, and clutch actuation is accomplished automatically by directing a controlled portion of system fluid to such clutches to overcome the normal spring bias thereof.

8 Claims, 2 Drawing Figures

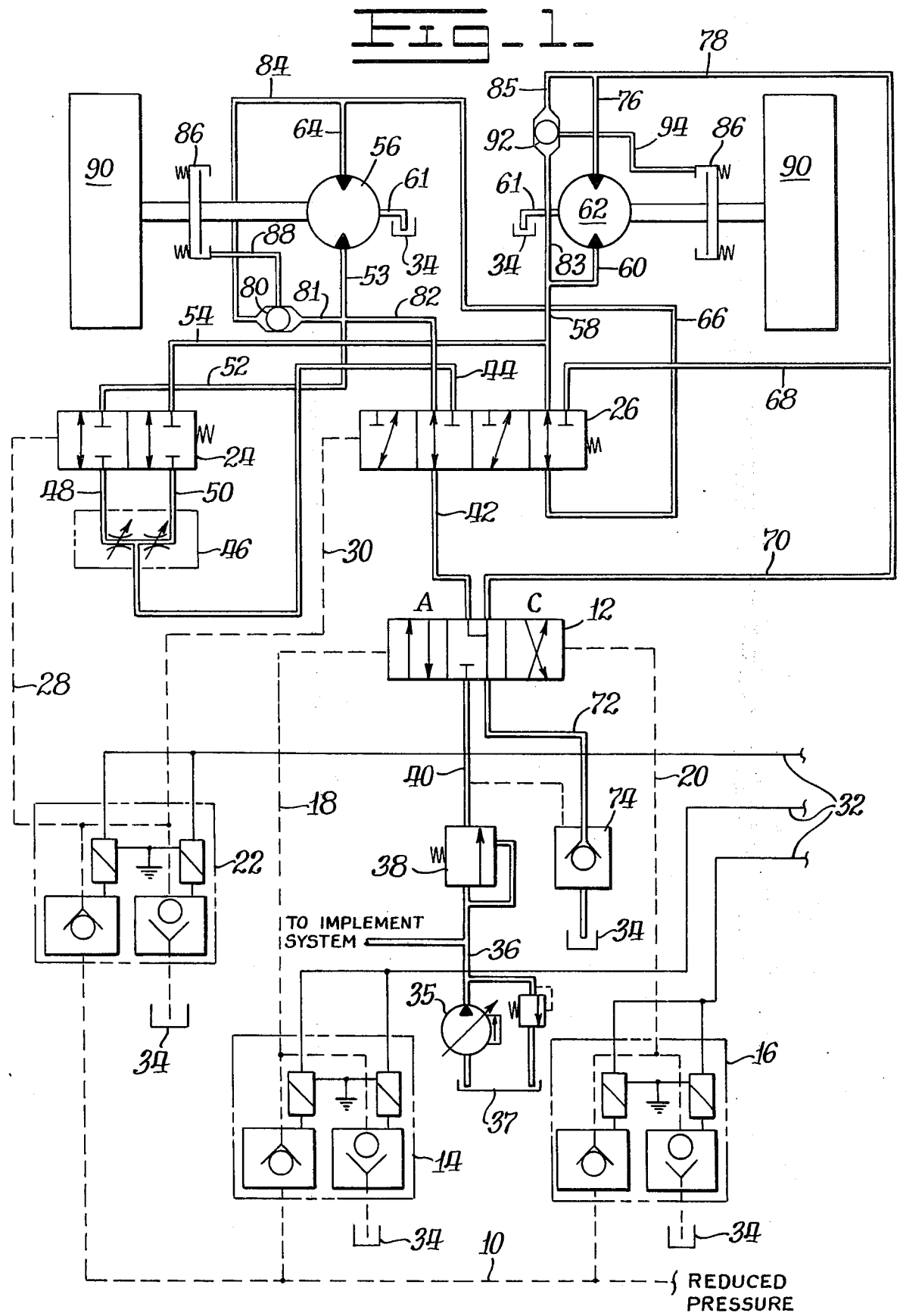

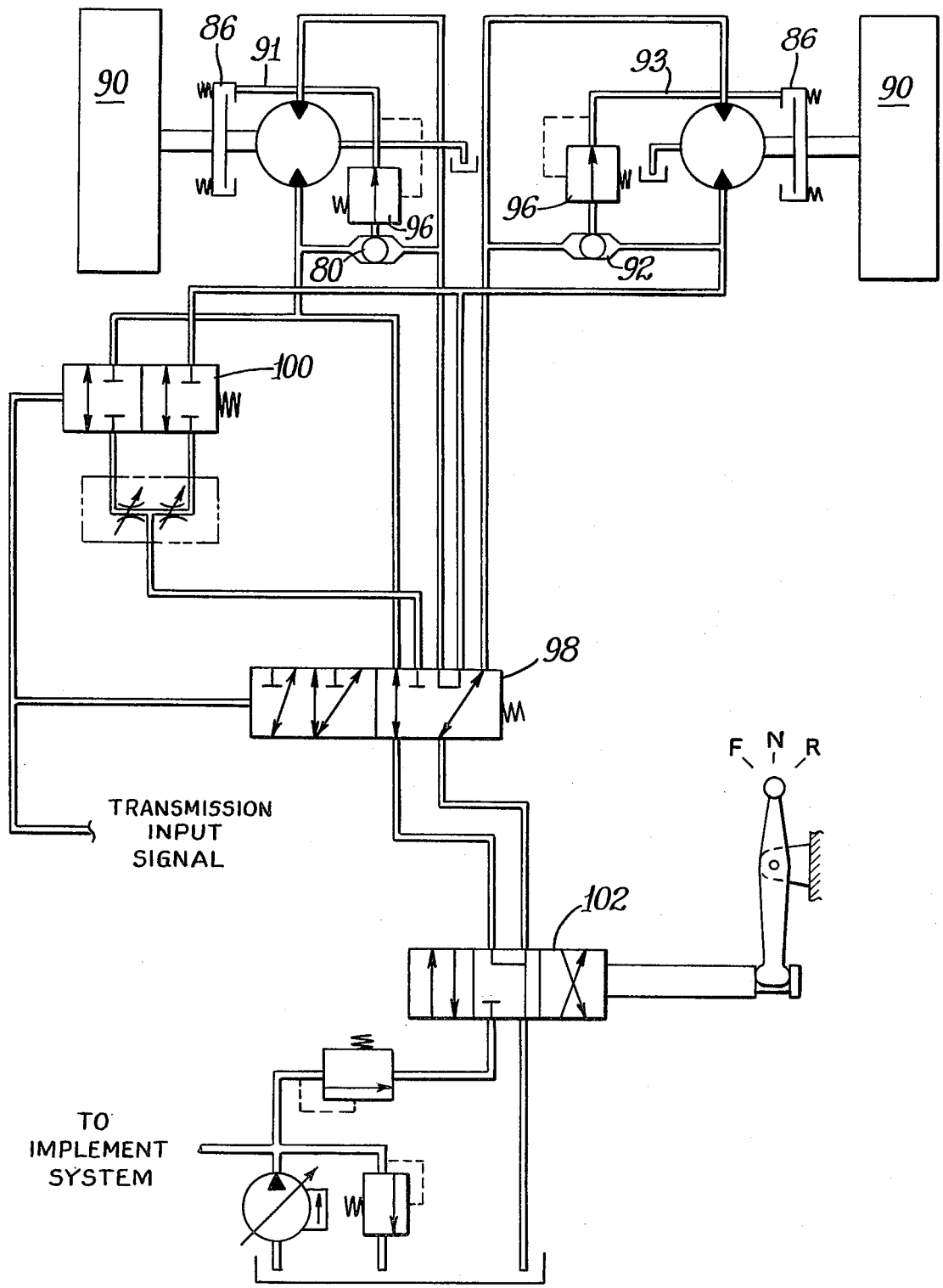

AUXILIARY HYDROSTATIC FRONT WHEEL DRIVE SYSTEM

BACKGROUND OF THE INVENTION

This invention relates to an auxiliary front wheel drive system for a vehicle, and more particularly, to such a system which utilizes implement system pressurized fluid flow for driving said front wheels.

Systems of the general type disclosed herein are shown in U.S. Pat. No. 3,458,005 to Malm et al., U.S. Pat. No. 3,480,099 to Nighswonger et al., and U.S. Pat. No. 3,481,419 to Kress et al. In such systems, a vehicle includes motors for driving the front wheel thereof, such motors being of the hydraulic type to be driven by fluid under pressure, in a series or parallel mode. Pressurized fluid supplied to each motor actuates a clutch associated with that motor so that a front wheel of the vehicle is drivingly engaged with the motor.

In any of the clutch engaging systems of these patents, it will be seen that the fluid pressure to be applied to such clutch for engagement thereof may be directed from either the fluid conduit of the motor associated with such clutch, or the fluid outlet conduit of such motor. While it will be seen that, in such situations, the higher of such two fluid pressures may be applied to the clutch for the engagement thereof, such clutch may in other situations be exposed to both the higher and lower pressures defined by such motor inlet and outlet conduits, resulting in a less than maximum fluid pressure being applied to such clutch to actuate it.

In addition, in the area of such clutch in any of these three patents, no means are provided for preventing excessive pressure buildup in the clutch.

Of more general interest in this area are U.S. Pat. No. 2,818,699 to Clemson, U.S. Pat. No. 3,153,908 to Lawrence, U.S. Pat. No. 3,184,994 to Stahl, U.S. Pat. No. 3,186,506 to Leach, U.S. Pat. No. 3,255,840 to Tangen, U.S. Pat. No. 3,272,576 to Budzich, U.S. Pat. No. 3,272,279 to Budzich, U.S. Pat. No. 3,302,741 to Brazuk, U.S. Pat. No. 3,354,977 to Swift, U.S. Pat. No. 3,391,753 to Anderson, U.S. Pat. No. 3,361,223 to Baver, U.S. Pat. No. 3,415,334 to Vriend, U.S. Pat. No. 3,469,648 to Cannon, U.S. Pat. No. 3,447,547 to Kress et al., U.S. Pat. No. 3,493,067 to Rumsey, U.S. Pat. No. 3,522,861 to Middlesworth et al., and U.S. Pat. No. 3,579,988 to Firth et al.

SUMMARY OF THE INVENTION

It is an object of this invention to provide an auxiliary drive system for a vehicle which incorporate fluid motors and fluid pressure actuated clutches which engage such motors with wheels of the vehicle, wherein the fluid pressure actuated clutches are properly supplied with the highest of the fluid pressures in the motor inlet and outlet means.

It is a further object of this invention to provide a system which, while fulfilling the above object, includes means for preventing excessive fluid pressure buildup in such clutches.

It is a still further object of this invention to provide a system which, while fulfilling the above objects, is simple in design and efficient in use.

Broadly stated, the invention is in a vehicle having a fluid motor associated with a wheel thereof, and a fluid pump and a fluid supply associated therewith. Inlet conduit means connect the pump and motor for supplying fluid under pressure from the pump to the motor, and outlet conduit means extend from the motor, the fluid flowing from the motor through such outlet conduit means. The fluid passes through the motor to drive the motor. Clutch means are engageable upon an application of fluid pressure thereto to effect a driving connection between the motor and wheel, and are disengageable to disconnect the motor and wheel. The improvement in such system comprises means for applying the greater of the fluid pressures in the inlet and outlet conduit means to the clutch means for inducing engagement thereof, and blocking the lesser of the fluid pressures in the inlet and outlet conduit means from the clutch means.

BRIEF DESCRIPTION OF THE DRAWINGS

These and other objects of the invention will become apparent from a study of the following specification and drawings, in which:

FIG. 1 is a schematic illustration of a first embodiment of a front wheel drive system of a vehicle; and FIG. 2 is a schematic illustration of a second embodiment of a front wheel drive system of the vehicle.

DESCRIPTION OF THE PREFERRED EMBODIMENTS

Shown in FIG. 1 is an auxiliary hydrostatic front wheel drive system for use with the front wheels 90 of a vehicle (not shown). The vehicle includes a main power source and rear wheels to be driven thereby, as is well known. The main power source of the vehicle drives the pump 35 which is utilized to operate the front wheel drive system of FIG. 1.

The operation of the combination of a motor 56, clutch 86, and wheel 90 associated therewith, and also the combination of the motor 62, clutch 86, and wheel 90 associated therewith, will be later described in detail. However, it should be understood that the motor 56 and clutch 86 combination are mounted in fixed positions relative to each other, and are in turn pivotally mounted to an end of an axle (not shown) so as to be pivotable relative thereto to allow changing of the attitude of the wheel 90 associated therewith, as is well-known. Likewise, the motor 62 and clutch 86 combination are in fixed positions relative to each other, and are pivotally mounted to the opposite end of such axle (not shown) to allow changing of the attitude of the wheel 90 associated therewith. Appropriate well-known means may be utilized to interconnect the structures associated with the ends of such axle so that the wheels 90 of the vehicle may be moved to chosen pivotal attitudes, so that the vehicle may be steered. It is to be understood that the conduits associated with the motors 56,62 and clutches 86 are flexible so as to allow such proper turning of the wheels.

Referring to FIG. 1, reduced pilot pressure in a conduit 10 is selectively communicated to a three-position pilot operated forward and reverse valve 12 via solenoid operated pilot control valve 14 and 16, which are in communication with conduits 18 and 20, respectively. Reduced pressure is also supplied from conduit 10 to a solenoid operated pilot control valve 22 which is selectively actuatable and permits the pilot signal to be communicated to control valve 24 and control valve 26 via conduits 28 and 30 respectively. The solenoid operated control valves 14,16 and 22 receive an electrical signal for actuation thereof which corresponds to the ground speed of the vehicle. An electrical on/off switch, not shown, that is selectively controlled by the operator, may block the current flow in lines 32, which places the system in its neutral condition when the front wheel drive is not required. When the vehicle transmission, not shown, is in the neutral position, or the electrical switch described above is blocking lines 32, the solenoid operated pilot signal control valves 14,16 and 22 vent the pilot signal lines to tank 34.

To operate the front wheel drive system, the operator closes the electrical switch described above, and shifts the vehicle transmission to the first position, forward. An electrical signal is then communicated to solenoid operated pilot control valves 14 and 22 which communicate pressurized fluid in conduit 10 to conduit 18, which shifts the forward and reverse control valve to its forward position "A." Pilot signal pressure in conduit 10 is also communicated to conduit 28 and conduit 30 by control valve 22, which shifts control valve 24 and control valve 26, respectively, to their second positions. Pressurized fluid in the vehicle implement system which is supplied by a variable displacement pressure compensated pump 35 associated with a fluid supply 37 is directed by a conduit 36 to a priority valve 38. Priority valve 38 maintains a predetermined minimum pressure in the implement system. When the pressure in conduit 36 is sufficient, priority valve 38 will shift to communicate pressurized fluid to conduit 40 and through valve 12 to conduit 42. Control valve 26 in its shifted position communicates the fluid from conduit 42 to conduit 44 and through flow divider/combiner valve 46, which proportionally divides the flow and directs it by conduits 48 and 50 to control valve 24 which is shifted to its actuated position to communicate flow to conduits 52 and 54.

Conduit 52 connects to conduit 53 which in turn is connected to fixed displacement hydraulic motor 56, and conduit 54 is ultimately connected to fixed displacement hydraulic motor 62 via conduits 58 and 60. The pressurized inlet fluid entering the motors 56 and 62 via the above path will cause them to rotate. Conduits 61 as shown are motor case drains and communicate motor leakage to tank 34. Outlet fluid from motor 56 flows through conduit 64 and is directed back to tank via conduit 66, valve 26, conduit 68, conduit 70, valve 12 and conduit 72. A pilot operated check valve 74 is normally open to tank during operation of the drive motors 56,62, and will be discussed later in conjunction with the operation of clutches associated with the motors 56,62. Fluid flow discharged from motor 62 is directed to tank 34 via conduits 76,78,70, valve 12 and conduit 72.

As seen in FIG. 1, a conduit 81 communicates with conduits 52,53, a conduit 84 communicates with conduits 64,66 and a conduit 88 communicates with a clutch 66, which is engageable upon application of fluid pressure in the conduit 88 to effect a driving connection between motor 56 and a wheel 90 of the vehicle. Likewise, a conduit 83 communicates with conduits 58,60, a conduit 85 communicates with conduits 76,78, and a conduit 94 communicates with a clutch 86 which is engageable upon application of fluid pressure in the conduit 94 to effect a driving connection between the motor 62 and a wheel 90 of the vehicle. These clutches are, of course, disengageable to disengage the respective motors and wheels.

A shuttle valve 80 connects conduits 81,84,88, so that the greater or higher of the fluid pressure in the conduits 81 (motor inlet pressure) or 84 (motor outlet pressure) is directed into the conduit 88 to engage the clutch 86, the shuttle valve 80 meanwhile blocking the lesser of the fluid pressures in conduits 81,84 from the conduit 88.

Likewise, a shuttle valve 92 connects conduits 83,85,94, and applies the greatest or highest of fluid pressure in conduits 83,85 to engage the clutch 86, meanwhile blocking off the lower of the fluid pressures in conduits 83,85 from the clutch 86.

The pilot operated check valve 74 establishes the necessary back pressure in the system at startup to insure clutch actuation. Once the system is in operation, the pilot operated check valve 74 is unseated by pilot pressure in conduit 40 to permit free flow to tank 34.

The above description details the operation of the parallel flow concept which establishes the low speed, high torque operation of the drive motors 56,62.

When the vehicle transmission control is shifted to its second speed range, the solenoid operated pilot signal valve 22 is vented to tank, which allows control valve 26 to shift back to its normal, or first or series position, as shown in FIG. 1, and allows control valve 24 to shift to its deactuated position, also as shown in FIG. 1. Pilot signal valve 14 remains actuated, and permits flow from the implement system to pass through conduits 36,40 and 42 to control valve 26 and further through conduits 82 and 53 to motor 56. Outlet flow from motor 56 passes through conduits 64 and 66, through control valve 26, conduits 58 and 60 and through motor 62, conduit 76, conduits 78 and 70, and through valve 12 and conduit 72 to tank 34. Actuation of the clutches 86 is achieved in a manner similar to that previously described.

When the vehicle transmission control is shifted to the reverse position, the solenoid operated pilot signal valve 16 communicates reduced pilot pressure to valve 12 which shifts the valve 12 to its position "C" allowing implement system flow to be directed to the motors in a direction opposite that previously described, and ultimately back to tank 34. Thus, inlet and outlet flows are reversed.

Referring to FIG. 2, this system is similar to that of FIG. 1 in that it uses the series-parallel flow concept and directional control valve to obtain two motor speeds in the forward direction and one motor speed in reverse. Clutch actuation in this system is achieved in a similar manner in that it utilizes shuttle valves 80,92 to pick a higher system pressure for actuating the clutches 86 by means of conduits 91, 93, equivalent to conduits 88,94 of FIG. 1, through which fluid pressure is supplied to the clutches 86. However, pressure reducing valves 96 are included in conduits 91,93 to prevent excessive pressure buildup in the clutches 86. Such valves are exposed to fluid pressure in the conduits 91,93 and will shift upon a level of pressure being achieved in conduits 91,93 to prevent further pressure buildup in the clutches 86.

It is to be noted that, in order to achieve series drive of the motors, the control valve 98 is shifted into its first or series position (as shown in FIG. 2). Parallel drive of the motors is provided only with the control valve 98 shifted into its second or parallel position, and the control valve 100 shifted from its deactuated position (as shown in FIG. 2) to its actuated position. (As set forth above, the system of FIG. 1 is substantially the same in this area.) The shifting of the valves 98,100 into such parallel and actuated conditions in the FIG. 2 embodiment takes place upon application of fluid pressure which is operatively associated with the valves 98,100 to so shift them upon a certain level of fluid pressure being achieved, the level of such fluid pressure being determined by the speed of the vehicle.

The forward and reverse valve 102 is manually actuated by the vehicle operator to any one of its three selectively actuated positions.

What is claimed is:

1. In a vehicle having a fluid motor associated with a wheel thereof, a fluid pump and a fluid supply associated therewith, inlet conduit means connecting the pump and motor for supplying fluid under pressure from the pump to the motor, outlet conduit means extending from the motor and through which fluid flows from the motor, the fluid passing through the motor to drive the motor, and clutch means engageable upon application of fluid pressure thereto to effect a driving connection between the motor and wheel, and disengageable to disconnect the motor and wheel, the improvement which comprises means for applying the greater of the fluid pressures in the inlet and outlet conduit means to the clutch means for inducing engagement thereof, and blocking the lesser of the fluid pressures in the inlet and outlet conduit means from the clutch means.

2. The apparatus of claim 1 wherein the means for applying the greater of the fluid pressures in the inlet and outlet conduit means to the clutch means and blocking the lesser of the fluid pressure in the inlet and outlet conduit means from the clutch means comprise a first conduit communicating with the inlet conduit means, a second conduit communicating with the outlet conduit means, a third conduit communicating with the clutch means and through which fluid pressure may be applied to the clutch means to effect engagement thereof, and means connecting the first, second and third conduits for directing the greater of the fluid pressures in the first and second conduits into the third conduit, and blocking the lesser of the fluid pressures in the first and second conduits from the fluid conduit.

3. The apparatus of claim 2 wherein the means connecting the first, second and third conduits comprise shuttle valve means.

4. The apparatus of claim 2 and further comprising means for preventing excessive fluid pressure buildup in the clutch means.

5. The apparatus of claim 4 wherein the means for preventing excessive fluid pressure buildup in the clutch means comprise valve means associated with the third conduit.

6. The apparatus of claim 3 and further comprising means for preventing excessive fluid pressure buildup in the clutch means.

7. The apparatus of claim 6 wherein the means for preventing excessive fluid pressure buildup in the clutch means comprise valve means associated with the third conduit.

8. In a vehicle having a pair of wheels, a pair of fluid motors associated therewith, means for transmitting power from the motors to drive the wheels, a fluid pump and a fluid supply associated therewith, and fluid circuit means operatively connecting the pump and the motors, the improvement comprising control means operatively associated with the fluid circuit means comprising a first control valve shiftable into a first position, wherein the motors are connected with the pump to be driven in series thereby, and into a second position, said control means further comprising a second control valve shiftable to an actuated position wherein, with the first control valve in its second position, the motors are connected with the pump to be driven in parallel thereby, the second control valve being shiftable to a deactuated position, said parallel drive being provided only with the first control valve in its second position and the second control valve in its actuated position and further comprising means for shifting the first control valve to its second position and for shifting the second control valve to its actuated position, comprising fluid pressure operatively associated with the first and second control valves to so shift said control valves to their second and actuated positions respectively upon a certain level of fluid pressure being achieved, the level of said fluid pressure being determined by the speed of the vehicle.

* * * * *

UNITED STATES PATENT AND TRADEMARK OFFICE
CERTIFICATE OF CORRECTION

PATENT NO. : 3,997,017
DATED : December 14, 1976
INVENTOR(S) : JOHN J. CAMPBELL et al It is certified that error appears in the above-identified patent and that said Letters Patent are hereby corrected as shown below:

Title Page, "[75] Inventors:"
first inventor's name should read:
--JOHN J. CAMPBELL--

Signed and Sealed this

Twenty-second Day of November 1977

[SEAL]

Attest:

RUTH C. MASON
Attesting Officer

LUTRELLE F. PARKER
Acting Commissioner of Patents and Trademarks